United States Patent [19]

Hosokawa et al.

[11] Patent Number: 5,225,882
[45] Date of Patent: Jul. 6, 1993

[54] MOVING BODY MEASURING APPARATUS
[75] Inventors: Tetsuo Hosokawa; Kazumitsu Nakajima, both of Tokyo, Japan
[73] Assignee: NEC Corporation, Tokyo, Japan
[21] Appl. No.: 871,994
[22] Filed: Apr. 22, 1992
[30] Foreign Application Priority Data
Apr. 23, 1991 [JP] Japan .................................. 3-090966
[51] Int. Cl.[5] ............................................... G01C 3/08
[52] U.S. Cl. ........................................... 356/5; 356/4
[58] Field of Search ............................... 356/4, 5, 141; 364/426.04; 342/70

[56] References Cited
U.S. PATENT DOCUMENTS

| | | | |
|---|---|---|---|
| 3,687,556 | 8/1972 | Price et al. | 356/152 |
| 4,477,184 | 10/1984 | Endo | 356/141 |
| 4,948,246 | 8/1990 | Shigematsu | 356/5 |
| 4,950,075 | 8/1990 | Ichinose et al. | 356/141 |

Primary Examiner—Mark Hellner
Attorney, Agent, or Firm—Burns, Doane, Swecker & Mathis

[57] ABSTRACT

A moving body measuring apparatus which can measure a distance and/or an azimuth angle to a moving body using a laser beam in a minimized measuring cycle with a simplified scanning mechanism under a minimized influence of a disturbance of the background light or the sunlight. Laser light is first shaped into a fan beam by expanding the same in a first direction by a fan beam shaping optical system. The fan beam is deflected in a second direction perpendicular to the first direction to scan by a uniaxial light scanning mechanism and is irradiated upon a target. Reflected light of the fan beam is deflected by the uniaxial light scanning mechanism and introduced into an optical detector by way of a light receiving optical system.

1 Claim, 8 Drawing Sheets

RELATIONSHIP BETWEEN DISTANCE AND ANGLE OF REFLECTING BODIES a TO e

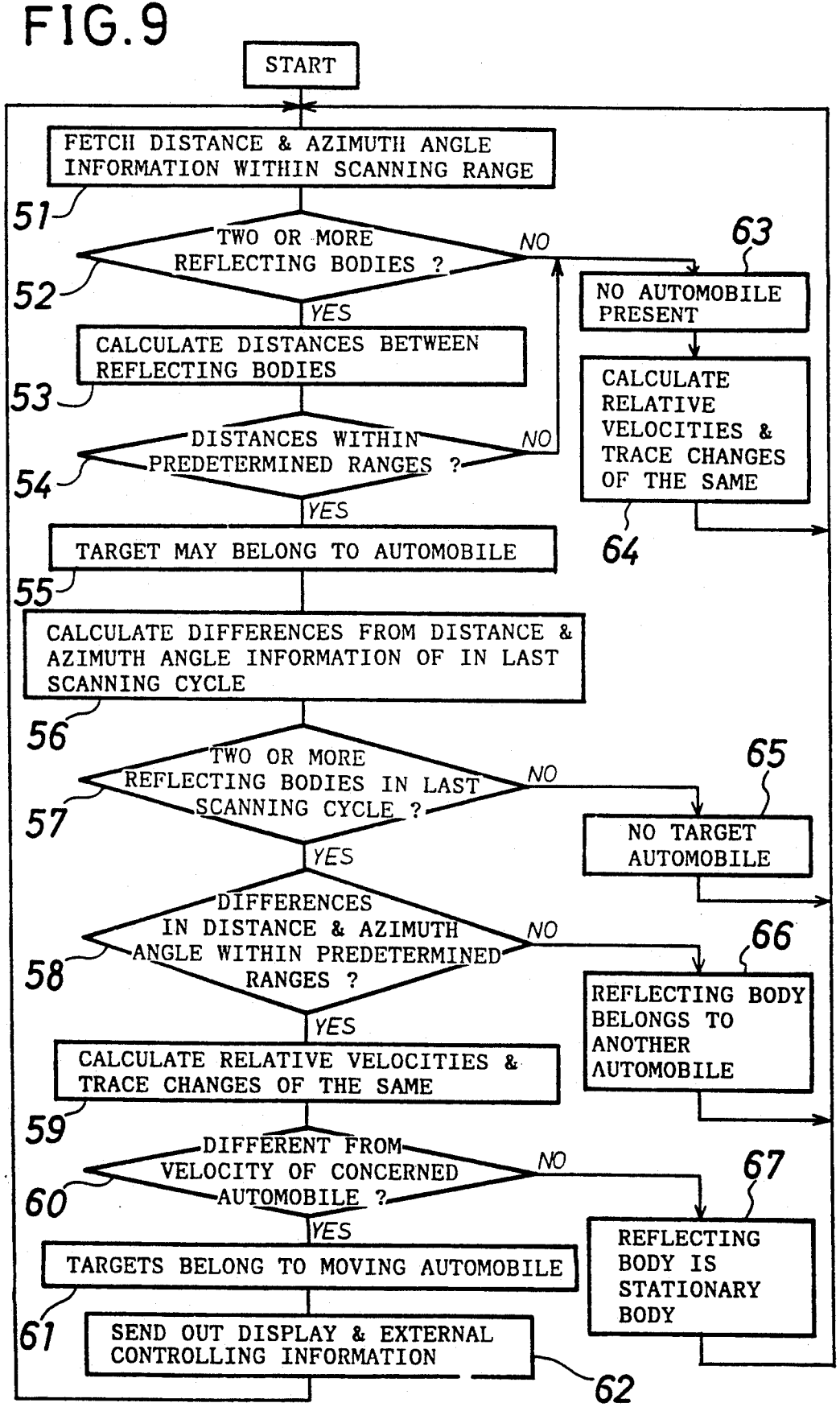

MOVING BODY MEASURING APPARATUS

BACKGROUND OF THE INVENTION

1. Field of the Invention

This invention relates to a moving body measuring apparatus for measuring a distance, an azimuth or the like to a moving body such as a vehicle using a laser beam.

2. Description of the Related Art

An obstacle detection system for vehicles which is carried on a vehicle to detect an obstacle using a laser beam is already known and disclosed, for example, in U.S. Pat. No. 4,477,184. The obstacle detection system two-dimensionally scans spot light of a pulse modulated laser beam by means of acousto-optic light deflectors so as to irradiate upon a stationary obstacle ahead of the vehicle or a target such as another vehicle running ahead of the running vehicle. Reflected light from the target is received and photo-electrically converted by a photo-detector, and an azimuth and a distance to the target at the laser beam reflecting point are calculated in accordance with an output of the photo-detector by arithmetic logic means. Then, the arithmetic logic means decides in accordance with a result of the calculation and a vehicle velocity signal from the vehicle whether a possibility of collision exists or whether the passing-through is possible.

The obstacle detection system for vehicles is advantageous in that, because a laser beam is contracted to a small directional angle, the power intensity of a laser beam coming upon a target is so high that a measurement of an object at a long distance can be achieved, and not only a distance and an azimuth to the target but also three-dimensional information such as a size (particularly in a vertical direction) of the target can be obtained. However, the obstacle detection system has such disadvantages as described below.

First, since a spot-like laser beam is two-dimensionally scanned in both horizontal and vertical directions to obtain measurement data for a screen, the number of emissions of a laser beam and the number of measurements per one frame are very great, and the time required for measurement per one frame is very long. In order to reduce the time, the period of laser oscillation must necessarily be reduced. However, the reduction in period is limited due to construction of laser oscillation, and consequently, a significant long period of time is required for measurement per one frame. Accordingly, if the distance or azimuth from the vehicle to the target changes during measuring processing for one screen, then part of data will become outdated. As a result, accurate measurement cannot be achieved for the entire one screen, or data processing is complicated because, for example, the outdated data must be corrected. The degree increases, when the target is a running vehicle, as the difference in speed between the vehicles increases.

Second, since two-dimensional scanning is involved, a mechanism for scanning operation is complicated and large in size. In particular, since a laser beam itself is very thin, a light deflector for scanning the laser beam in one direction may be of the small size. However, another light deflector for scanning the laser beam deflected in one direction further in another perpendicular direction must necessarily be disposed in a sufficiently spaced relationship from the first light deflector in order to prevent otherwise possible interference between the light deflectors. Besides, also a mechanism for synchronizing the two light deflectors with each other is necessitated. Consequently, the entire scanning mechanism is complicated and large in size.

Third, while an acoustic-optic light deflector for diffracting a laser beam with ultrasonic waves is employed in order to assure high speed two-dimensional scanning and the deflection angle of light is changed by changing the frequency of the ultrasonic waves, it is disadvantageous in that the deflection angle is limited, that a high ultrasonic wave output is required in order to obtain a sufficiently high deflection efficiency, that it is difficult to manufacture, the power consumption is high, and that it must be cooled because light is disturbed otherwise by thermal distortion thereof by a temperature gradient caused by heat energy into which ultrasonic wave energy is converted.

Fourth, a light receiving optical system must necessarily have a field of view of a sufficient area in order to receive reflected light which is two-dimensionally scanned as described above. Consequently, a light receiving optical element has a large area, and a photo-detector likely suffers from noises as much. Further, since the light receiving field of view is great, an influence of the background light or sunlight is so high that measurement may be impossible in some cases.

In this manner, the conventional obstacle detection system for vehicles which involves two-dimensional scanning has various disadvantages in practical use and is complicated in structure and expensive. Further, when the first to fourth problems described above are taken into consideration, particularly in case the target is a running automobile, it is a question whether a satisfactory result of measurement can actually be obtained because the running automobile presents a great variation in velocity and in advancing direction.

By the way, in case the moving target is assumed to be an automobile, it will not present a significantly great positional variation in a vertical direction, and accordingly, the position thereof in a vertical direction need not necessarily be measured for practical use (for example, when the measurement is conducted principally in order to prevent a rear-end collision or to maintain a predetermined distance from another vehicle). Thus, if, when measurement data for a screen are to be obtained by scanning of a laser beam, the laser beam is expanded in a vertical direction and is scanned only in a horizontal direction, then although data of a position in a vertical direction cannot be obtained, the time required for scanning and measurement for one screen can be decreased significantly and besides the mechanism for such scanning and measurement is simplified considerably comparing with the conventional measurement which involves two-dimensional scanning in vertical and horizontal directions.

SUMMARY OF THE INVENTION

It is an object of the present invention to provide a moving body measuring apparatus which minimizes the time required for scanning and measurement for one screen in measuring a distance or an azimuth to a moving body such as an automobile using a laser beam.

It is another object of the present invention to provide a moving body measuring apparatus wherein a scanning mechanism for scanning a laser beam to measure a distance or an azimuth to a moving body such as an automobile is simplified in structure.

It is a further object of the present invention to provide a moving body measuring apparatus wherein the light receiving field of view is minimized to minimize a possible influence of a disturbance of the background light or sunlight.

It is a still further object of the present invention to provide a moving body measuring apparatus wherein measurement data can be processed readily.

It is a yet further object of the present invention to provide a moving body measuring apparatus for use for prevention of a rear-end collision of an automobile or for maintenance of a distance between automobiles which can function at a sufficiently high speed against a variation in velocity or in advancing direction of the automobile and is simple in overall structure, small in size, low in cost and high in practical use.

In order to attain the objects, according to the present invention, there is provided a moving body measuring apparatus which comprises a laser oscillator, an optical system for expanding laser light from the laser oscillator in a first direction to shape the same into a fan beam, a uniaxial light scanning mechanism including first light deflecting means for deflecting the fan beam in a second direction perpendicular to the first direction to scan the same, optical detecting means for receiving reflected light of the fan beam from a moving body to produce an electric signal, threshold means for generating a threshold level signal, comparing means for comparing the electric signal from the optical detecting means with the threshold level signal, and calculating means responsive to an output of the comparing means for calculating, when the electric signal exceeds the threshold level signal, at least one of a distance and an azimuth angle to the moving body. Preferably, the first direction is a vertical direction and the second direction is a horizontal direction.

With the moving body measuring apparatus, laser light is shaped into a fan beam which expands in the first direction, i.e., in the vertical direction, and the fan beam is scanned in the second or horizontal direction perpendicular to the first or vertical direction so as to irradiate upon a moving body as a target. Then, reflected light from the moving body is received. Accordingly, although position data in the first direction are not obtained, the time required for scanning and measurement for one screen is reduced remarkably, and consequently, the laser emitting period can be increased and the scanning speed of the scanning mechanism can be made low as much. Consequently, the scanning mechanism is simplified in structure comparing with two-dimensional scanning of a spot-shaped laser beam in the two vertical and horizontal directions.

Since the fan beam scanned expands only in the vertical direction but is thin in the horizontal direction, it has a higher energy density than a beam which expands also in the horizontal direction. Consequently, also the amount of light reflected from a target is so great, although it is not so high as that obtained with a spot-shaped laser beam, that a sufficiently high level of received light can be obtained from a target or moving body at a comparatively remote distance. When viewed from a different point of view, the power of an output laser beam can be reduced for necessary measurement of a distance or the like, which is advantageous for safety of an eye of a human being, for removal of a disturbance of the sunlight or the like and for miniaturization.

When the fan beam which expands in the vertical direction is scanned in the horizontal direction within a predetermined angular range, it will never fail to come to a target or moving body and a signal of a level higher than a threshold level necessary for measurement of a distance or the like can be obtained from the photodetector. Further, since information of an angle of emission of a laser beam can be obtained, even if a plurality of targets are present, a distance and an azimuth angle to each of the targets can be measured.

The moving body measuring apparatus is particularly effective when the moving body has a portion such as a reflector of an automobile having a particularly high reflectivity comparing with other bodies which may possibly exist around the moving body.

Since the fan beam is scanned in one direction, i.e., in the second direction, if an optical system of the light receiving side is also deflected in synchronism with scanning of the fan beam, then the light receiving field of view can be reduced to reduce a possible disturbance from the background light, sunlight or the like and enhance the S/N ratio in optical detection. In this instance, the uniaxial light scanning mechanism further includes second light deflecting means which operates in synchronism with the first light deflecting means to receive reflected light from the moving body and introduce the received reflected light to the optical detecting means. The first and second light deflecting means of the uniaxial light scanning mechanism may be constructed as a single rotary reflecting mirror.

Preferably, the uniaxial light scanning mechanism scans the fan beam repetitively over a predetermined angle for a fixed period. With the construction, the calculating means can trace whether or not the moving body is moving relative to the moving body measuring apparatus and further whether the moving body is moving toward or away from the moving body measuring apparatus by comparing a distance calculated in the current scanning cycle and another distance calculated in the last or some other preceding scanning cycle with each other in magnitude. Alternatively, the calculating means can trace a change in azimuth of the moving body by comparing a distance calculated in the current scanning cycle and another distance calculated in the last or some other preceding scanning cycle with each other in magnitude.

When the moving body measuring apparatus is used with an automobile in order to prevent a rear-end colliding accident of the automobile or maintain a distance of the automobile from another automobile running ahead, it can cope at a sufficiently high processing rate with a variation in velocity or a change in advancing direction of the automobile running ahead. Besides, as such, it is generally simple in structure, small in size, low in cost and high in practical use.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 9 is a flow chart illustrating an algorithm for discrimination, measurement and tracing of an automobile executed by the moving body measuring apparatus of FIG. 3.

DETAILED DESCRIPTION OF THE PREFERRED EMBODIMENT

Figure 1:
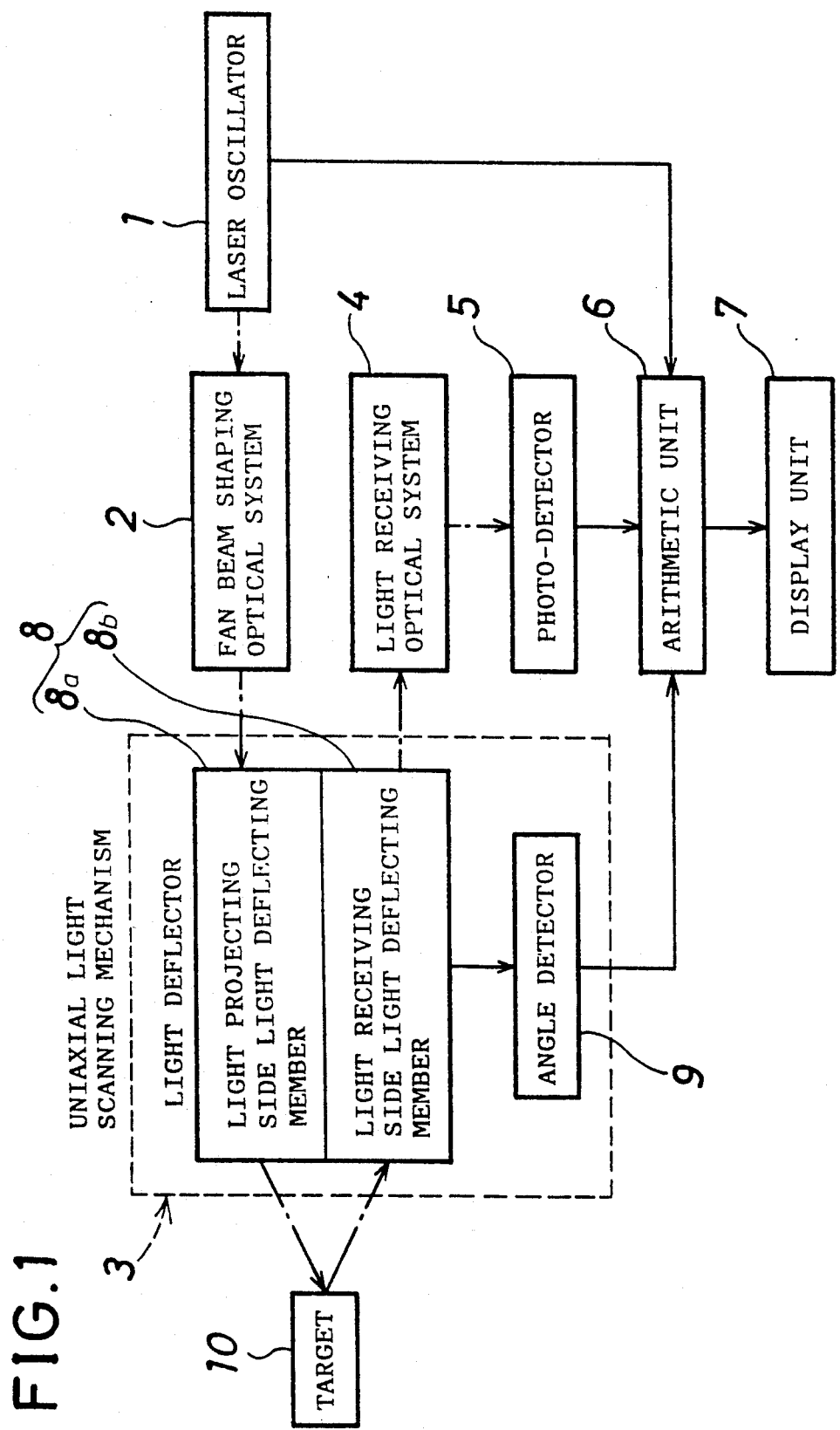
FIG. 1 is a block diagram showing fundamental construction of a moving body measuring apparatus according to the present invention.

Referring first to FIG. 1, there is shown fundamental construction of a moving body measuring apparatus according to the present invention. The moving body measuring apparatus shown includes a laser oscillator 1, a fan beam shaping optical system 2, a uniaxial light scanning mechanism 3, a light receiving optical system 4, a photo-detector 5, an arithmetic unit 6 and a display unit 7 and is carried, for example, on an automobile.

Figure 2:
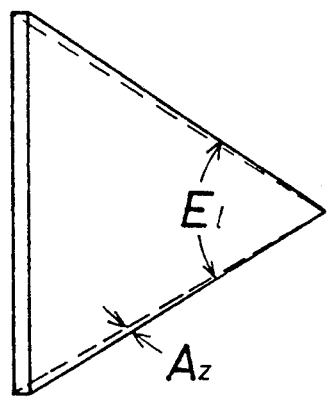
FIG. 2 is a diagrammatic view illustrating an fan beam used in the moving body measuring apparatus.

Referring to FIG. 2, the fan beam shaping optical system 2 shapes a laser beam emitted from the laser oscillator 1 into a fan beam which expands, as it advances, at a large elevation angle El in a vertical direction but at a very small azimuth angle Az in a horizontal direction.

Referring back to FIG. 1, the uniaxial light scanning mechanism 3 includes a rotary light deflector 8 having a light projecting side light deflecting member 8a and a light receiving side light deflecting member 8b, and an angle detector 9 for detecting an angular position of the light deflector 8. In order to cause a fan beam shaped by the fan beam shaping optical system 2 to irradiate upon a target 10, the light deflector 8 deflects the fan beam in a horizontal direction by means of the light projecting side light deflecting member 8a to scan the same repetitively for a fixed period of time within a predetermined angular range (predetermined azimuth angle) in the horizontal direction. Further, in order to receive reflected light from the target 10 in a limited narrow field of view, the light receiving side light deflecting member 8b is rotated together with the light projecting side light deflecting member 8a to deflect the reflected light from the target 10 in a direction opposite to that by the light projecting side light deflecting member 8a by means of the light receiving side light deflecting member 8b.

The light receiving system 4 converges the light deflected by the light receiving side light deflecting member 8b and introduces the same to the photo-detector 5. The photo-detector 5 includes photo-electric transducer means not shown and converts the incidence light into an electric signal having a level corresponding to the amount of the incidence light. The arithmetic unit 6 may be constituted, for example from a microcomputer and calculates, when an electric signal from the photo-detector 5 exceeds a predetermined threshold level, a distance to the target 10 in a known manner either from a difference in time between the point of time and a point of time of oscillation of the laser beam or from a difference in phase between the transmitted light and the received light. The arithmetic unit 6 also calculates an azimuth angle of the target 10 from information of an angle received from the angle detector 9. The distance and the azimuth angle calculated in this manner are displayed on the display unit 7.

It is to be noted that, if the arithmetic unit 6 judges whether or not the thus calculated distance and azimuth angle remain within respective predetermined ranges and controls, in accordance with a result of the judgment, an alarm (not shown) or driving of the concerned automobile on which the moving body measuring apparatus is carried, then prevention of a rear-end colliding accident of the automobile or maintenance of a predetermined distance to another preceding automobile can be achieved. In this instance, a display by the display unit 7 is not always necessary. Further, if a distance calculated upon scanning by the uniaxial light scanning mechanism 3 in an operation cycle prior by one or more cycles to the present operation cycle is stored in a memory and the arithmetic unit 6 compares the thus stored distance in magnitude with another distance calculated upon scanning in the present operation cycle, then it can be determined whether or not the target 10 is a moving body, whether or not the target 10 is moving relative to the concerned automobile, and further, whether or not the target 10 is moving toward or away from the concerned automobile. Further, if an azimuth angle calculated upon scanning by the uniaxial light scanning mechanism 3 is an operation cycle prior by one or more cycles to the present invention operation cycle is stored in the memory and the arithmetic unit 6 compares the thus stored azimuth angle in magnitude with another azimuth angle calculated upon scanning in the present control cycle, then also a change in azimuth angle (change in direction in a horizontal plane) to the target 10 can be discriminated.

Figure 3:
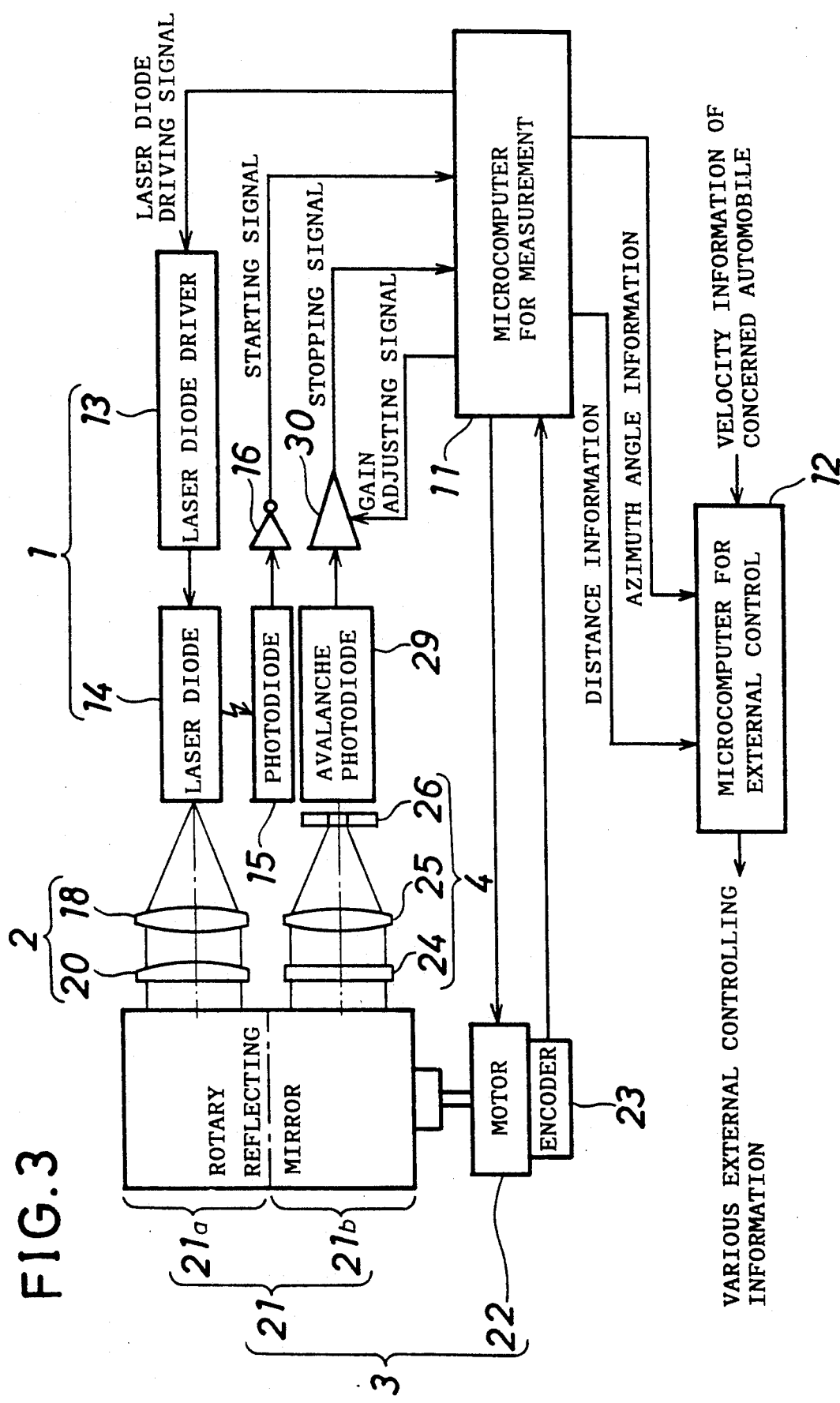
FIG. 3 is a block diagram showing a moving body measuring apparatus to which the present invention is applied.

Referring now to FIG. 3, there is shown a moving body measuring apparatus to which the present invention is applied. The moving body measuring apparatus of the present embodiment is generally constructed such that a microcomputer 11 for measurement takes charge of controlling of internal components of the moving body measuring apparatus and execution of measuring processing while another microcomputer 12 for external control takes charge of external signal processing.

Figure 4:
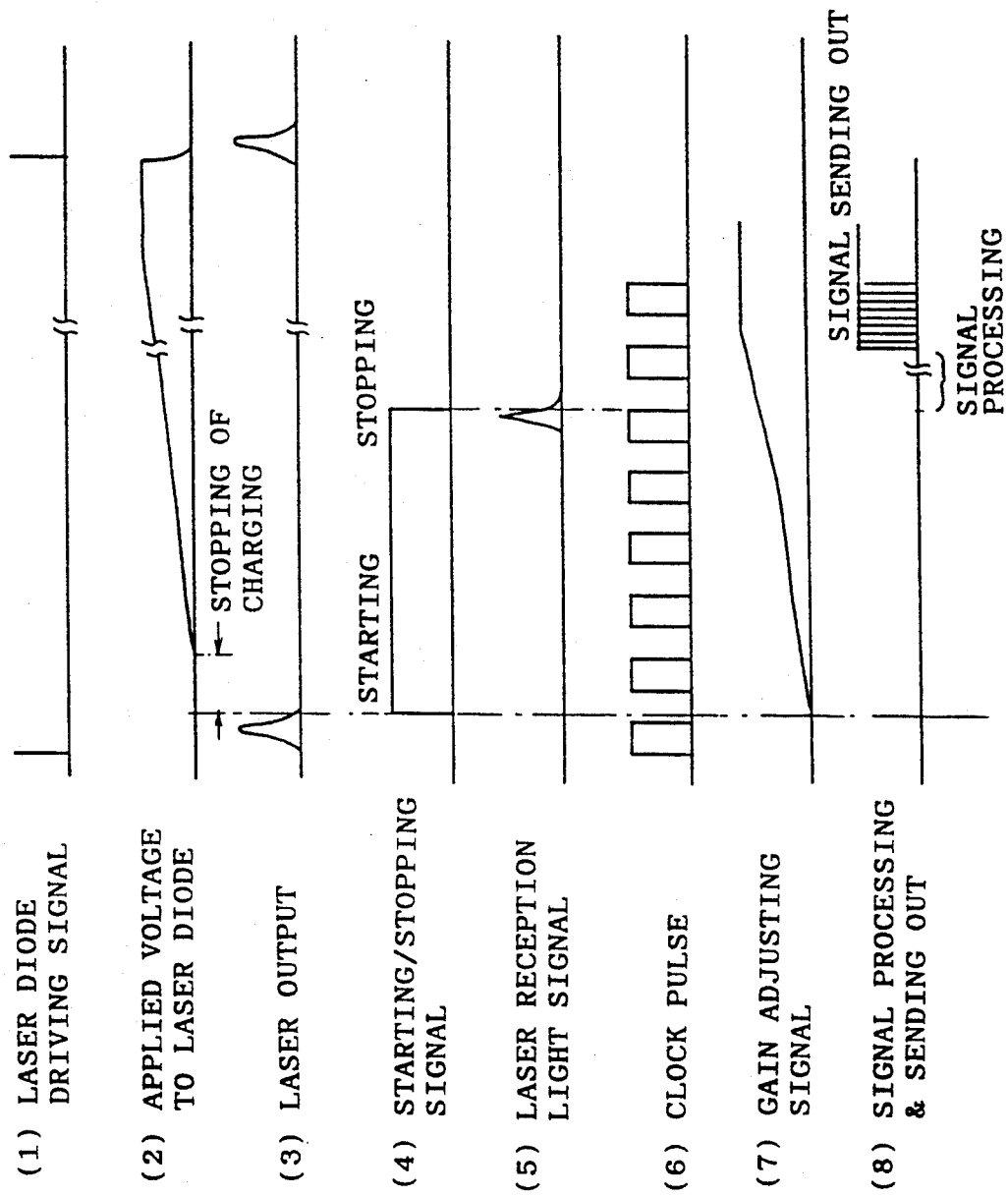
FIG. 4 is a time chart illustrating operation of the moving body measuring apparatus of FIG. 3.

The microcomputer 11 for measurement supplies such laser diode driving signal of a fixed period as seen from a curve (1) in FIG. 4 to a laser diode driver 13 of an oscillator 1. The laser diode driver 13 is normally charged, except for a predetermined fixed interval of time, gradually by suitable charging means not shown in such a manner as indicated by another curve (2) in FIG. 4, and each time a laser diode driving signal is received from the microcomputer 11, the laser diode driver 13 discharges and applies a charged voltage thereof across the laser diode 14 to drive the laser diode 14. Consequently, the laser diode 14 emits a pulse-modulated laser beam after each predetermined fixed period of time as seen from a curve (3) in FIG. 4. Part of the laser beam from the laser diode 14 is detected by a photo-diode 15 for detection of emission of a laser beam. An output of the photo-diode 15 is amplified by an amplifier 16 and inputted to the microcomputer 11, in which it is treated as a starting signal for starting a measuring operation for a distance as seen from a curve (4) in FIG. 4.

Figure 5:
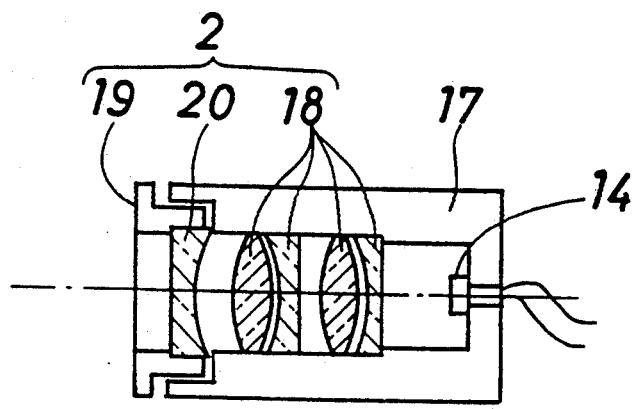
FIG. 5 is a schematic sectional view of a fan beam shaping optical system of the moving body measuring apparatus of FIG. 3.

The laser beam emitted from the laser diode 14 is shaped into such a fan beam as shown in FIG. 2 by a fan beam shaping optical system 2. Referring now to FIG. 5, the fan beam shaping optical system 2 is shown in detail. The fan beam shaping optical system 2 includes a plurality of collimate lenses 18 mounted fixedly in a lens housing 17 on which the laser diode 14 is carried. The fan beam shaping optical system 2 further includes a lens holder 19 mounted for adjustable back and forth movement with respect to the lens housing 17, and a cylindrical lens 20 held on the lens holder 19. The collimate lenses 18 collimate a laser beam from the laser diode 14 into a parallel laser beam, and the cylindrical lens 20 expands the parallel laser beam only in one direction (in a vertical direction) into a fan beam. The expanding angle can be adjusted by adjusting the cylindrical lens 20 forwardly or backwardly with respect to the lens housing 17. It is to be noted that the collimate lenses 18 and the cylindrical lens 20 may otherwise be disposed in the reverse relationship in the forward and backward direction.

Referring back to FIG. 3, a light deflector 8 for deflecting a fan beam in a horizontal direction to scan the same includes a rotary reflecting mirror 21 elongated in an axial direction, and a motor 22 for rotating the rotary reflecting mirror 21 around its axis. A rotational angle or angular position of the motor 22 and hence of the rotary reflecting mirror 21 is detected as a digital electric signal by an encoder 23. The rotary reflecting mirror 21 deflects, at a light projecting side deflecting area 21a thereof, a fan beam from the fan beam shaping optical system 2 to cyclically scan the same within a predetermined angular range in a horizontal direction, and deflects, at another light receiving side deflecting area 21b thereof, light reflected from a reflecting body so that it may be directed in the same direction as that by the light projecting side deflecting area 21a. Rotation of the motor 22 is controlled in accordance with a signal from the microcomputer 11, and a digital electric signal from the encoder 23 is inputted as scanning angle information (azimuth angle) at the current point of time to the microcomputer 11.

Figure 6:
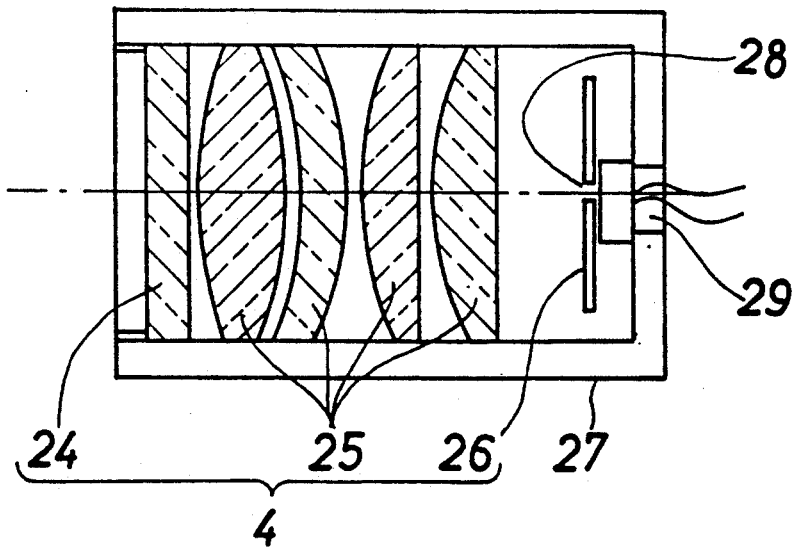
FIG. 6 is a schematic sectional view of a light receiving optical system of the moving body measuring apparatus of FIG. 3.
Figure 7A:
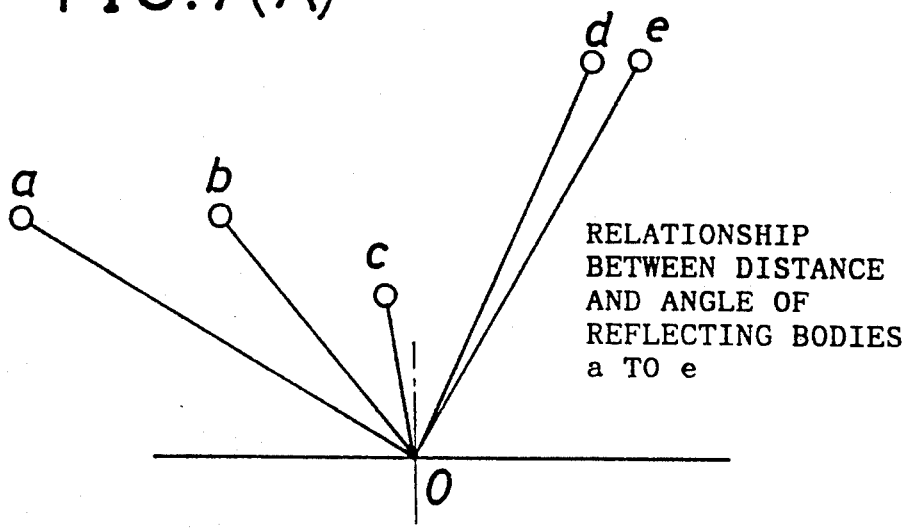
FIGS. 7a-7d show a diagram illustrating a relationship between a scanning angle and a scanning time, another relationship between the scanning time and reception signals from a plurality of reflecting bodies and a further relationship between angles and distances calculated when the reflecting bodies are scanned from the left to the right during scanning of a fan beam for one period.
Figure 7B:
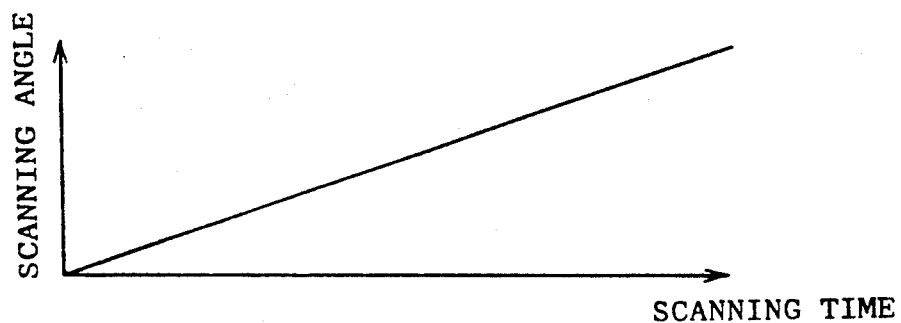
Figure 7C:
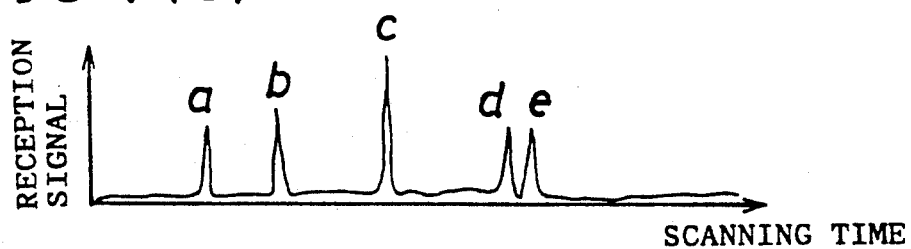
Figure 7D:
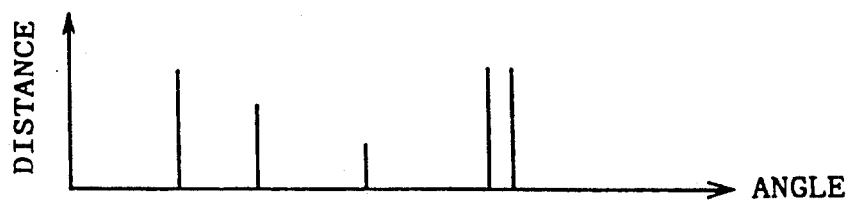

The reflected light thus deflected by the light receiving side deflecting area 21b of the rotary reflecting mirror 21 is then converged by a light receiving optical system 4. Referring now to FIG. 6, the light receiving optical system 4 is shown in more detail and includes an interference filter (or an infrared filter) 24 for removing unnecessary light (background light and sunlight), a plurality of converging lenses 25 and a slit plate 26 all disposed in a lens housing 27. The slit plate 26 has a vertically elongated slit 28 formed therein for contracting, since light projected from the light projecting side deflecting area 21a is a fan beam which expands only in a vertical direction, the field of view of light converged by the converging lenses 25 to detect only reflected light of the fan beam. The slit plate 26 is mounted for horizontal leftward and rightward adjusting movement in order to allow adjustment of the optical axis of received light with respect to that of the light projecting side.

Light having passed through the slit 28 is introduced into an avalanche photodiode 29 which may be a photodetector having a high sensitivity, and is detected as an electric signal corresponding to an amount of incidence light by the avalanche photodiode 29. The avalanche photodiode 29 presents such an output as shown by a curve (5) in FIG. 4, and the output of the avalanche photodiode 29 is amplified by a variable amplifier 30 and then inputted to the microcomputer 11. The microcomputer 11 thus judges whether or not the inputted signal exceeds a predetermined threshold level, and when the input signal exceeds the threshold level, the microcomputer 11 uses the input signal as a stopping signal for stopping a measuring operation of a distance as seen from the curve (4) in FIG. 4.

The microcomputer 11 counts, by means of a counter not shown therein, such clock pulses from a clock generator not shown as seen from a curve (6) of FIG. 4 only for a period of time from a starting signal obtained at a point of time of emission of a laser beam to a stopping signal obtained when the level of an electric signal obtained by reception of reflected light exceeds the predetermined threshold level. The microcomputer 11 then calculates, from the count value, a distance to the reflecting body at the current point of time, that is, a rectilinear distance from the emitting point of a laser beam to the reflecting point in accordance with a known calculating method. The microcomputer 11 also calculates, from angle information from the encoder 23 obtained at a point of time of reception of a stopping signal, an azimuth angle to the reflecting body, that is, an angle of the reflecting point in the horizontal plane with respect to the laser beam emitting point at the current point of time.

Referring to FIG. 7, a relationship between a scanning angle at the laser beam emitting point 0 and a scanning time when five reflecting bodies a to e are scanned from the left to the right during scanning of a fan beam for one period, another relationship between the scanning time and reception signals originating from the reflecting bodies, that is, an electric signal of reflected light from the reflecting bodies, and a further relationship between an angle and a distance calculated from the reception signals are shown from above.

By the way, reflected light of a fan beam is comparatively intense when it is reflected from a comparatively small distance but is comparatively weak when it is reflected from a comparatively remote distance. Thus, in order to minimize a difference in level in intensity of light arising from a difference in distance, the microcomputer 11 inputs such a gain adjustment signal corresponding to a count value of the counter or a distance calculated thereby as shown by a curve (7) in FIG. 4 to the variable amplifier 30 to automatically adjust the gain of the variable amplifier 30.

After a distance and an azimuth angle to each of the reflecting bodies are calculated by the microcomputer 11 for measurement as described above, the distance information and the azimuth angle information are sent out from the microcomputer 11 prior to a next scanning cycle as seen from a curve (8) of FIG. 4 and inputted to the microcomputer 12 for external control. The microcomputer 12 also receives velocity information from a speedometer not shown which measures a velocity of the concerned automobile. The microcomputer 12 thus executes, in accordance with the distance information and azimuth angle information from the microcomputer 11 for measurement and the velocity information from the speedometer, judgment whether a reflecting body is an automobile running ahead of the concerned automobile, measurement of a velocity of the automobile running ahead, measurement of an actual distance and azimuth angle to the automobile running ahead and so forth. The microcomputer 12 sends out information and/or a controlling signal obtained by the measurement to external apparatus such as, for example, an indicator, an alarm, a brake system of the concerned automobile or the like.

Figure 8:
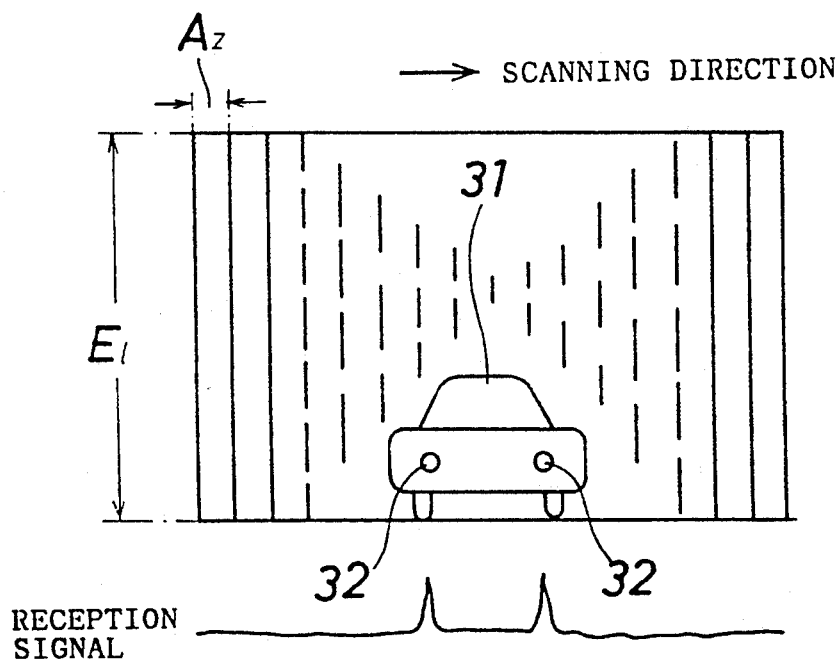
FIG. 8 is a diagrammatic schematic view illustrating scanning with a fan beam of a target which is an automobile running ahead of the concerned automobile.

By the way, an automobile 31 normally has a pair of left and right reflectors 32 at a rear end thereof as shown in FIG. 8. Accordingly, if the automobile 31 is scanned from the left to the right with a fan beam (having an expanding angle El in a vertical direction and a thickness Az in a horizontal direction) which expands to an extent which sufficiently covers the height of the automobile 31, then reception signals when reflected light is received from the left and right reflectors 32 always present levels higher than a predetermined level and are spaced from each other by a distance in time corresponding to the distance between the left and right reflectors 32. Therefore, if such measurements of a distance and an azimuth angle as described above are performed making use of the reflectors 32 as targets, then the automobile 31 can be identified readily from some other objects.

FIG. 9 illustrates a flow of operations the microcomputer 12 for external control executes for each one scanning period including such identification of an automobile. Referring to FIG. 9, the microcomputer 12 for external control first fetches, at step 51, distance information and azimuth angle information of all of a reflecting body or bodies reception signals from which are determined to be higher than the predetermined threshold level during one scanning operation by the microcomputer 11 for measurement, and stores the fetched information into a memory not shown. the microcomputer 12 then judges, at step 52, whether or not two or more reflecting bodies are involved. In case two or more reflecting bodies are involved, the microcomputer 12 calculates, at step 53, a distance in a forward and backward direction and another distance in a leftward and rightward direction between each adjacent two of the reflecting bodies and then judges, at step 54, whether or not the thus calculated distances remain within respective predetermined ranges. If the calculated distances between any two of the reflecting bodies remain within the respective predetermined ranges, the microcomputer 12 determines at step 55 that the two reflecting bodies likely belong to an automobile running ahead of the concerned automobile.

Subsequently, the microcomputer 12 recalls from the memory, at step 56, distance information and azimuth angle information of all of a reflecting body or bodies in the last scanning cycle and calculates differences of them from the distance information and azimuth angle information of the corresponding reflecting bodies in the present scanning cycle, respectively. Then, the microcomputer 12 determines, at step 57, whether two or more reflecting bodies are involved also in the last scanning operation, and in case two ore more reflecting bodies are involved, the microcomputer 12 judges at step 58 whether or not the differences in distance and azimuth angle calculated at step 56 remain within respective predetermined ranges. If the differences remain within the respective predetermined ranges, then the microcomputer 12 determines that the reflecting bodies are moving relative to (toward or away from) the concerned automobile and calculates, at step 59, a relative velocity of the reflecting bodies and traces a change in distance and a change in azimuth angle.

It is to be noted that, from a legal velocity limit for an automobile, an amount of data exceeding 30 screens per one second is seldom required, and in most cases, an amount of the data below 30 screens per one second is sufficient. In the moving body measuring apparatus of the present embodiment, since laser light is shaped into a fan beam and scanned in only one direction to obtain a screen, even when 30 screens are required per one second, the scanning rate may be equal to 30 Hz or so in the one direction. Accordingly, a scanning mechanism for the scanning operation may be of such a mechanical construction as described above, and the microcomputers 11 and 12 need not process at a particularly high rate.

Subsequently at step 60, the microcomputer 12 judges whether or not an absolute value of the relative velocity is different from the velocity of the concerned automobile, and if the relative velocity is different, then the microcomputer 12 determines at step 61 that the reflecting body is a moving body, that is, an automobile which is moving. After then, the microcomputer 12 sends out, at step 62, various information so that, for example, the distance to the automobile running ahead is displayed on the indicator or, when the distance is within a predetermined range, an operation for preventing a rear-end collision with the automobile is performed such as producing an alarming sound, operating the brake system or the like. After then, the control sequence of the microcomputer 12 returns to step 51.

In case it is judged at step 52 that two or more reflecting bodies are not involved, that is, only one or no reflecting body is involved in the scanning range, the control sequence of the microcomputer 12 advances to step 63, at which the microcomputer 12 determines that no target, that is, no automobile, is present. After then, the microcomputer 12 calculates, at step 64, a relative speed of the reflecting body and traces a change in distance and a change in azimuth angle to the reflecting body, whereafter the control sequence returns to step 51.

On the other hand, in case it is judged at step 57 that two or more reflecting bodies are not involved, the microcomputer 12 determines at step 65 that a target automobile running ahead has disappeared, and after then, the control sequence returns to step 51. In this instance, either the reflecting body has been any other object than an automobile or the automobile ahead has disappeared from the field of view for detection.

In case it is judged at step 58 that the difference in distance and the difference in azimuth angle are outside the respective predetermined ranges, the microcomputer 12 determines at step 66 that the reflecting bodies belong to different automobiles, and after then, the control sequence returns to step 51. In this instance, either another automobile has entered the field of view for detection or the automobile already identified has disappeared from the field of view for detection.

In case it is judged at step 60 that an absolute value of the relative velocity is equal to the velocity of the concerned automobile, the microcomputer 12 determines at step 67 that the reflecting body is a stationary body, and after then the control sequence returns to step 51.

If a pair of left and right reflectors of an automobile are employed as targets and correlation is taken between distance information and azimuth angle information obtained in each scanning cycle and distance information and azimuth angle information obtained in the last or some other preceding scanning period as described above, even if there is a reflector installed on the road, a land bridge or the like, an automobile as a target can be identified readily.

It is to be noted that, while an automobile is taken as an example of moving body in the foregoing description, the moving body to which the present invention can be applied is not limited to an automobile, and many changes and modifications can be made to the moving body measuring apparatus of the embodiment described above without departing from the spirit and scope of the invention as set forth herein.

What is claimed is :

1. A moving body measuring apparatus, comprising:
   a laser oscillator;
   a fan beam shaping optical system for expanding laser light from said laser oscillator in a vertical direction to shape the laser light into a fan beam;
   a light scanning mechanism for deflecting the fan beam in a horizontal direction to repetitively scan the fan beam over a predetermined angle at a fixed period;
   a light receiving optical system for converging light of the fan beam reflected from a moving body;
   optical detecting means for detecting the light converged by said light receiving optical system to produce an electric signal; and
   calculating means for calculating, when the electric signal from said optical detecting means exceeds a predetermined threshold level, at least one of a distance and an azimuth angle to the moving body;
   said fan beam shaping optical system including a plurality of collimating lenses and at least one cylindrical lens;
   said light scanning mechanism being separate from said fan beam shaping optical system and said light receiving optical system, said light scanning mechanism including a vertically elongated rotary reflecting mirror, a motor for rotating said rotary reflecting mirror, and an encoder for detecting a rotational angular position of said rotary reflecting mirror, said rotary reflecting mirror being vertically sectioned into a light projecting side deflecting are for deflecting the fan beam from said fan beam shaping optical system and a light receiving side deflecting area for deflecting the reflecting light from the moving body to direct the same to said light receiving optical system;
   said light receiving optical system including a plurality of converging lenses and a slit plate having a slit being disposed such that light deflected by said light receiving side deflecting area of said rotary reflecting mirror is converged by said converging lenses and then introduced into said optical detecting means through said slit of said slit plate.

* * * * *